(12) United States Patent
Zarr

(10) Patent No.: US 7,860,251 B1
(45) Date of Patent: Dec. 28, 2010

(54) ENCRYPTION-DECRYPTION CIRCUIT AND METHOD OF OPERATION

(75) Inventor: Richard F. Zarr, Sanford, FL (US)

(73) Assignee: National Semiconductor Corporation, Santa Clara, CA (US)

( * ) Notice: Subject to any disclaimer, the term of this patent is extended or adjusted under 35 U.S.C. 154(b) by 1903 days.

(21) Appl. No.: 10/106,262

(22) Filed: Mar. 26, 2002

(51) Int. Cl.
*H04L 9/06* (2006.01)

(52) U.S. Cl. .......................................... 380/265; 380/43

(58) Field of Classification Search .................. 380/37, 380/42, 265, 43; 377/64, 72–73
See application file for complete search history.

(56) References Cited

U.S. PATENT DOCUMENTS

| | | | | |
|---|---|---|---|---|
| 3,657,699 | A | * | 4/1972 | Rocher et al. ............... 380/265 |
| 3,899,951 | A | * | 8/1975 | Griffith et al. ................. 84/617 |
| 4,228,712 | A | * | 10/1980 | Uchiyama et al. ............. 84/655 |
| 4,304,962 | A | * | 12/1981 | Fracassi et al. ............... 380/42 |
| 4,965,881 | A | * | 10/1990 | Dilley ........................ 380/268 |
| 5,365,588 | A | * | 11/1994 | Bianco et al. ................ 380/42 |
| 5,377,270 | A | * | 12/1994 | Koopman et al. ........... 380/262 |
| 5,910,907 | A | * | 6/1999 | Chen et al. .................. 708/313 |
| 6,763,363 | B1 | * | 7/2004 | Driscoll ...................... 708/252 |
| 7,035,290 | B1 | * | 4/2006 | Lyle .......................... 370/498 |
| 7,068,788 | B2 | * | 6/2006 | Haque et al. ................ 380/265 |
| 7,558,326 | B1 | * | 7/2009 | Lyle et al. ................... 375/244 |

OTHER PUBLICATIONS

Alfred J. Menezes, Paul C. Van Oorschot, Scott A. Vanstone. Handbook of Applied Cryptography. 1997. CRC Press LLC. pp. 191-222.*
Bruce Schneier. Applied Cryptography: Protocols, Algorithms, and Source Code in C. 1996. John Wiley & Sons, Inc. pp. 372-395.*
Apparatus for Low to Medium Secure Encoding of Data. IBM Technical Disclosure Bulletin. vol. 23. Issue 7A. Dec. 1980. pp. 2966-2967.*
Schneier, Bruce. Applied Cryptography. 1996. John Wiley & Sons. Inc. Second Edition. pp. 4, 15-17, 173, 181, 372-379, 382-385.*

* cited by examiner

*Primary Examiner*—Matthew B Smithers
*Assistant Examiner*—Tamara Teslovich

(57) ABSTRACT

An encryption-decryption circuit for encrypting and decrypting data. The encryption-decryption circuit comprises: 1) an N-bit shift register for storing and shifting an N bit keyword; 2) a first exclusive-OR gate array for receiving M bits from the N-bit shift register and generating a one-bit exclusive-OR result that is shifted into an input of the N-bit shift register; and 3) a second exclusive-OR gate array comprising K exclusive-OR gates, each of the K exclusive-OR gates receiving one of K bits from the N-bit shift register and one of K data bits from a received K-bit data word and generating therefrom an exclusive-OR result. The K exclusive-OR gates thereby produce one of: i) a K-bit encrypted data word and ii) a K-bit unencrypted data word.

35 Claims, 3 Drawing Sheets

ENCRYPTION-DECRYPTION CIRCUIT AND METHOD OF OPERATION

TECHNICAL FIELD OF THE INVENTION

The present invention relates generally to data encoding and decoding circuits and, in particular, to a simple encoding and decoding circuit for use in a microcontroller or similar processing circuit having limited memory and processing power.

BACKGROUND OF THE INVENTION

A wide array of consumer and business electronic devices can be upgraded by receiving (i.e., downloading) application programs and data files from an external network, such as the Internet. Initially, this method of upgrading electronic devices was limited primarily to personal computers. Increasingly, however, software upgrades can be applied to ever smaller devices, including cell phones, handheld computers (such as a PalmPilot™) MP3 players, and the like.

Quite often, application programs and data files are encrypted prior to transmission and then decrypted by the downloading device. Encryption is used to prevent the downloaded application programs and data files from being corrupted and/or tampered with during transmission. The application programs and data files are encrypted along with redundancy checksum values derived from the application programs and data files. If the redundancy checksum values are not correct after decryption, the downloaded software may be corrupted and is discarded. Encryption also is used to prevent the downloaded application programs and data files from being illegally copied onto unauthorized devices. Many encryption systems use an embedded encryption key that is unique to each downloading device. Unauthorized devices do not have the correct encryption key and, therefore, cannot decrypt the encrypted downloaded software.

Conventional encryption and decryption techniques require a good deal of memory and processing power. For example, the popular Rivest-Shamir-Adleman (RSA) public key encryption algorithm (and similar cyphers) use large binary numbers (i.e., 1024 bits) and exponential mathematics to encrypt and decrypt data. This requires a great deal of random access memory (RAM) to hold large numbers and also requires wide (i.e., 64 bits or greater) data processors to perform the calculations in a reasonably short period of time.

Unfortunately, many of the smaller devices (e.g. cell phones, handheld computers, MP3 players) that are capable of receiving software upgrades are controller by small (i.e., 8 bit or 16 bit) microcontrollers containing small FLASH memories. These types of devices do not have the required memory size and processing throughput necessary to implement conventional encryption and decryption schemes, such as the RSA public key encryption algorithm.

Therefore, there is a need in the art for improved encryption and decryption systems that do not require large memories and high processing throughput. In particular, there is a need for an encryption and decryption system for use with 8-bit and 16-bit microprocessors, microcontrollers, and similar small scale processors.

SUMMARY OF THE INVENTION

To address the above-discussed deficiencies of the prior art, it is a primary object of the present invention to provide an encryption-decryption circuit for encrypting and decrypting data. According to an advantageous embodiment of the present invention, the encryption-decryption circuit comprises: 1) an N-bit shift register for storing and shifting an N bit keyword; 2) a first exclusive-OR gate array capable of receiving M bits from the N-bit shift register and generating a one-bit exclusive-OR result that is shifted into an input of the N-bit shift register; and 3) a second exclusive-OR gate array comprising K exclusive-OR gates, each of the K exclusive-OR gates capable of receiving one of K bits from the N-bit shift register and one of K data bits from a received K-bit data word and generating therefrom an exclusive-OR result, the K exclusive-OR gates thereby producing one of: i) a K-bit encrypted data word and ii) a K-bit unencrypted data word.

The present invention advantageously allows encryption and decryption operations to be performed using only binary (i.e. base 2) mathematics and operators. In an embodiment in which N equals 128 bits, a shift register of only 16 bytes is required and the number of possible keywords is approximately $3.4 \times 10^{38}$.

According to one embodiment of the present invention, the encryption-decryption circuit further comprises a N-bit buffer for storing the N-bit keyword.

According to another embodiment of the present invention, the N-bit keyword is unique to the encryption-decryption circuit.

According to still another embodiment of the present invention, the encryption-decryption circuit further comprises a N×M switch capable of coupling M selected ones of the N bits in the N-bit shift register to the first exclusive-OR gate array.

According to yet another embodiment of the present invention, the encryption-decryption circuit further comprises a N×K switch capable of coupling K selected ones of the N bits in the N-bit shift register to inputs of the K exclusive-OR gates in the second exclusive-OR gate array.

According to a further embodiment of the present invention, the second exclusive-OR gate array further comprises adder circuitry capable of adding a K-bit value to the K-bit encrypted data word.

According to a still further embodiment of the present invention, the second exclusive-OR gate array further comprises subtraction circuitry capable of subtracting a K-bit value from the received K-bit data word prior to generation of the exclusive-OR result by the second exclusive-OR gate array.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before understanding the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
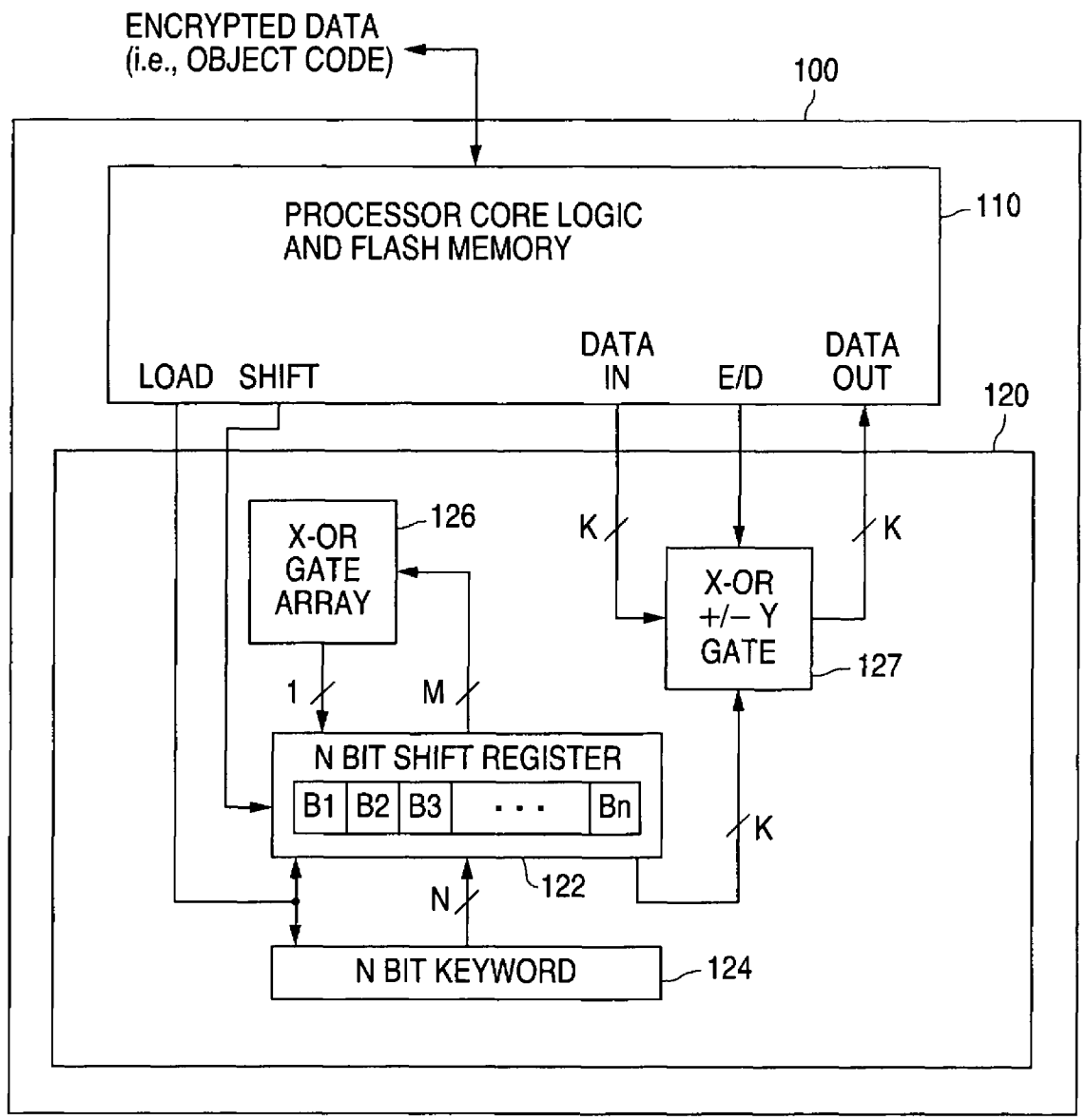
FIG. 1 illustrates an exemplary microcontroller containing an encryption-decryption circuit according to a first embodiment of the present invention.
Figure 2:
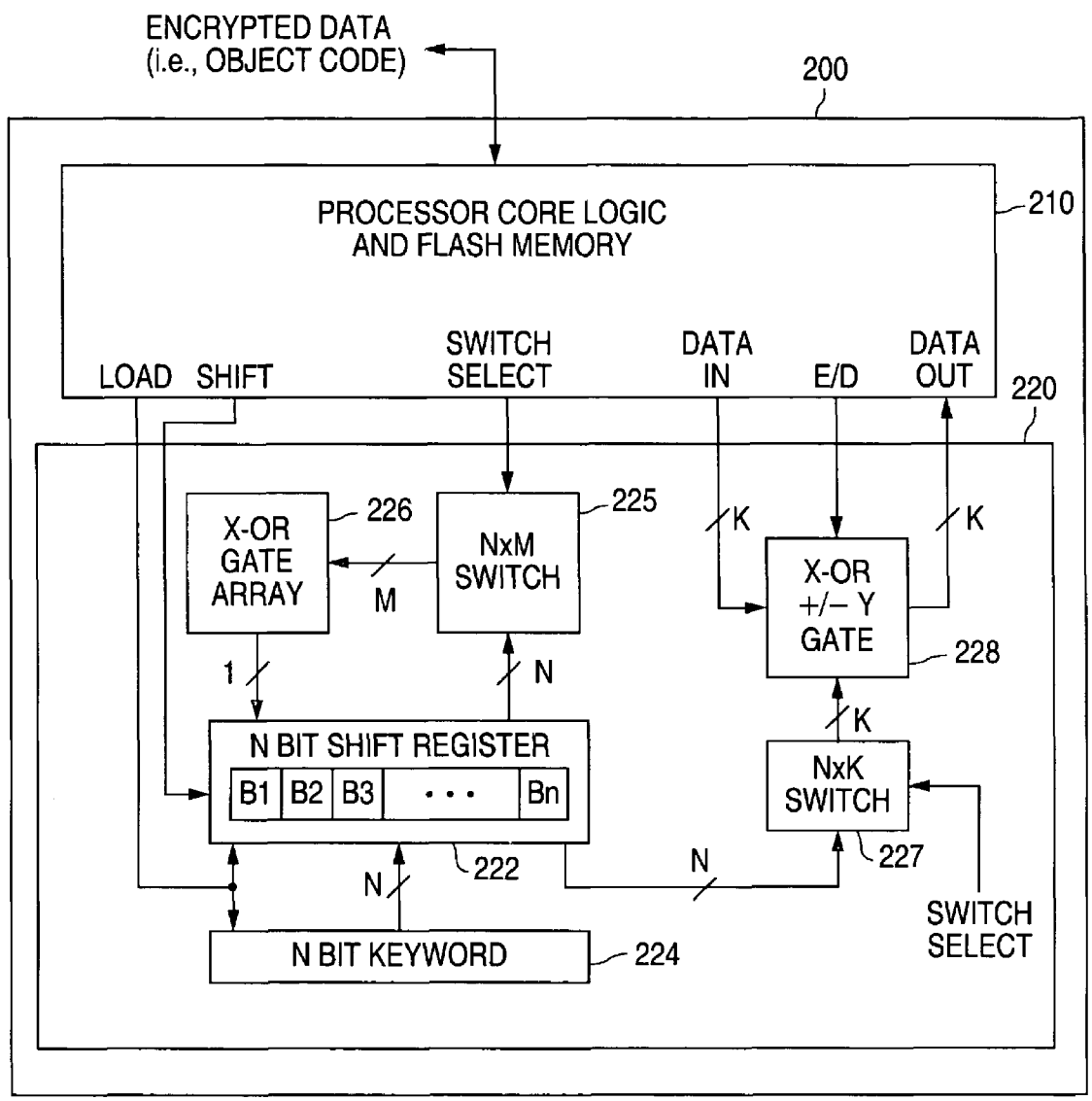
FIG. 2 illustrates an exemplary microcontroller containing an encryption-decryption circuit according to a second embodiment of the present invention.
Figure 3:
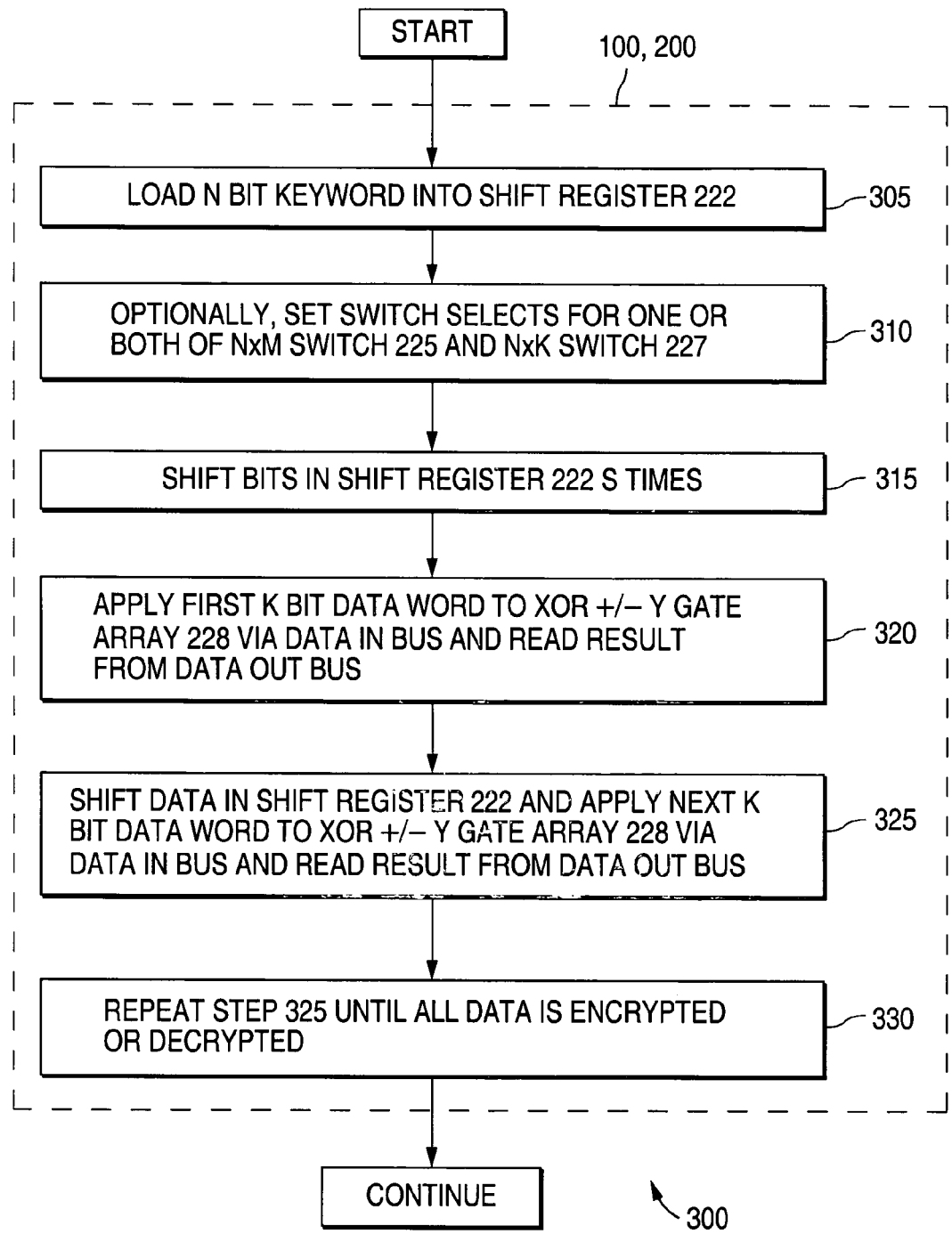
FIG. 3 is a flow diagram illustrating the operation of the exemplary encryption-decryption circuit according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged microprocessor, microcontroller, or similar data processor.

FIG. 1 illustrates exemplary microcontroller 100, which contains an encryption-decryption circuit according to a first embodiment of the present invention. Microcontroller 100 comprises processor core logic and FLASH memory circuit 110 and encryption and decryption circuit 120. Processor core logic and FLASH memory circuit 110 executes the primary functions of microcontroller 100. Encryption and decryption circuit 120 is used to encrypt and decrypt data.

According to an advantageous embodiment of the present invention, microcontroller 100 is able to receive encrypted data, such as object code, from an external source, such as the Internet or an external processing system to which microcontroller 100 is connected. Advantageously, microcontroller 100 may also send encrypted data to the external source. Processor core logic and FLASH memory circuit 110 controls encryption and decryption circuit 120 using the control lines LOAD, SHIFT, ENCRYPT/DECRYPT (E/D), and the data buses DATA IN and DATA OUT. When the ENCRYPT/DECRYPT is set to Encrypt Mode, processor core logic and FLASH memory circuit 110 is operable to transfer unencrypted data to encryption and decryption circuit 120 on the K-bit DATA IN bus and to receive encrypted data from encryption and decryption circuit 120 on the K-bit DATA OUT bus. When the ENCRYPT/DECRYPT is set to Decrypt Mode, processor core logic and FLASH memory circuit 110 is operable to transfer encrypted data to encryption and decryption circuit 120 on the K-bit DATA IN bus and to receive unencrypted data from encryption and decryption circuit 120 on the K-bit DATA OUT bus.

Encryption and decryption circuit 120 comprises N-bit shift register 122, N-bit keyword buffer 124, exclusive-OR (XOR) gate array 126, and exclusive-OR (XOR) +/− Y gate array 127. N-bit keyword buffer 124 contains an N-bit binary data key that is unique to microcontroller 100. The key may be broken into two N/2-bit keys, one of which is held within microcontroller 100, such as a serial number. This is used to limit the distribution of the software to only one target machine (such as a license upgrade).

Processor core logic and FLASH memory circuit 110 loads the key into N-bit shift register 122 by enabling the LOAD signal. XOR gate array 126 receives M arbitrary bits from N-bit shift register 122 and determines a single bit exclusive-OR result of all M bits. Thus, the single bit XOR result, f(b), is given by:

$$f(b)=Ba \oplus Bb \oplus Bc \oplus \ldots \oplus Bg$$

where $Ba, Bb, Bc, \ldots,$ and $Bg$ are the M arbitrarily selected ones of bits $B1, B2, B3, \ldots, Bn$ from N-bit shift register 122. The XOR result, f(b), is then input to N-bit shift register 122. Processor core logic and FLASH memory circuit 110 shifts the N binary bits in N-bit shift register 122 using the SHIFT control signal.

For each shift of N-bit shift register 122, K arbitrary bits from N-bit shift register 122 are also applied to XOR +/− Y gate array 127. XOR +/− Y gate array 127 comprises K exclusive-OR gates, each of which has two inputs and one output. Each of the K arbitrary bits from N-bit shift register 122 is XORed with one of the K bits on the DATA IN bits to produce one of the K bits on the DATA OUT bus. Since exclusive OR is a reversible operation if the output (i.e., result) and one input are known, the present invention has the advantage of being symmetrical between encryption and decryption.

Thus, unencrypted data may be encrypted by exclusive-ORing with the K bits from N-bit shift register 122. The encrypted data may then be decrypted by exclusive-ORing with the K bits from N-bit shift register 122. The data pattern in N-bit shift register is completely deterministic given a known key and the number of shifts.

According to an advantageous embodiment, the K bit binary value Y may be added after the XOR operation during Encryption Mode and K bit binary value Y may be subtracted prior to the XOR operation during Decryption Mode. In an exemplary embodiment of the present invention, Y=0, so that only the XOR function is implemented by XOR +/− Y gate array 127.

According to an advantageous embodiment of the present invention, the value of K is the same as the data width of processor core logic and FLASH memory circuit 110. Thus, if microcontroller 100 is an 8-bit processing device, K=8, if microcontroller 110 is a 16-bit processing device, K=16, and so forth.

By way of example, in a representative microcontroller, N-bit shift register 122 may be a 128 shift register, M may be 25, and K may be 16. Thus, the 128 bits from 128 bit keyword buffer 124 may be loaded into shift register 122 and shifted S times to an arbitrary starting point. On each shift, 25 arbitrary bits from shift register 122 are exclusive-ORed (XORed) together to produce a one bit result that is shifted into shift register 122. Once the starting point is reached, 16 arbitrary bits from shift register 122 are XORed with the 16 bits from the DATA IN bus to produce 16 encrypted bits on the DATA OUT bus. Each subsequent shift of shift register 122 produces a new 16 bit pattern that is XORed with the next 16 bit data word on the DATA In bus, until all data words are encrypted.

A similar operation occurs during decryption. The 128 bits from 128 bit keyword buffer 124 are loaded into shift register 122 and shifted S times to the arbitrary starting point, just as during encryption. On each shift, 25 arbitrary bits from shift register 122 are exclusive-ORed (XORed) together to produce a one bit result that is shifted into shift register 122. Once the starting point is reached, 16 arbitrary bits from shift register 122 are XORed with the 16 encrypted data bits from the DATA IN bus to produce 16 unencrypted bits on the DATA OUT bus. Each subsequent shift of shift register 122 produces a new 16 bit pattern that is XORed with the next 16 bit encrypted data word on the DATA IN bus, until all encrypted data words are unencrypted (decrypted).

FIG. 2 illustrates exemplary microcontroller 200 containing an encryption-decryption circuit according to a second embodiment of the present invention. Microcontroller 200 is similar to microcontroller 100 in FIG. 1 in most respects. Microcontroller 200 comprises processor core logic and FLASH memory circuit 210 and encryption-decryption circuit 220. Processor core logic and FLASH memory circuit 210 executes the primary functions of microcontroller 200. Encryption and decryption circuit 220 is used to encrypt and decrypt data.

Processor core logic and FLASH memory circuit 210 controls encryption and decryption circuit 220 using the control lines LOAD, SHIFT, and ENCRYPT/DECRYPT (E/D), the switch select control lines, SWITCH SELECT, and the data buses DATA IN and DATA OUT. When the ENCRYPT/DECRYPT is set to Encrypt Mode, processor core logic and FLASH memory circuit 210 is operable to transfer unencrypted data to encryption-decryption circuit 220 on the K-bit DATA IN bus and to receive encrypted data from encryption and decryption circuit 220 on the K-bit DATA OUT bus. When the ENCRYPT/DECRYPT is set to Decrypt Mode, processor core logic and FLASH memory circuit 210 is operable to transfer encrypted data to encryption and decryption circuit 220 on the K-bit DATA IN bus and to receive unencrypted data from encryption and decryption circuit 220 on the K-bit DATA OUT bus.

Encryption and decryption circuit 220 comprises N-bit shift register 222, N-bit keyword buffer 224, N×M switch 225, exclusive-OR (XOR) gate array 226, N×K switch 227, and exclusive-OR (XOR) +/− Y gate array 228. N-bit keyword buffer 224 contains an N-bit binary data key that is unique to microcontroller 200.

The primary difference between microcontroller 200 and microcontroller 100 in FIG. 1 is that the M bits applied to XOR gate array 226 are not fixed, but rather are selectable by the SWITCH SELECT control signals using N×M switch 225. Similarly, the K bits applied to XOR gate array 228 are not fixed, but rather are selectable by the SWITCH SELECT control signals using N×K switch 225. Switch 225 and switch 227 are optional and may be implemented to provide additional levels of security.

FIG. 3 depicts flow diagram 300, which illustrates the operation of the exemplary encryption-decryption circuit according to the principles of the present invention. Initially, microcontroller 200 loads the N bit keyword into shift register 222 (process step 305). Optionally, microcontroller 200 sets SWITCH SELECT signals for one or both of N×M switch 225 and N×K switch 227 if the switches are implemented (process step 310). Next, microcontroller 200 shifts the bits in shift register 222 S times to establish a starting point (process step 310). Then, microcontroller 200 applies the first K bit data word to XOR +/− Y gate array 228 via the DATA IN bus and reads the result from the DATA OUT bus (process step 320). Finally, microcontroller 200 shifts the data in shift register 222 and applies the next K bit data word to XOR +/− Y gate array 228 via the DATA IN bus and reads the result from the DATA OUT bus (process step 325). Microcontroller 200 repeats step 325 until all data is encrypted or decrypted (process step 330).

Although the present invention has been described in detail, those skilled in the art should understand that they can make various changes, substitutions and alterations herein without departing from the spirit and scope of the invention in its broadest form.

What is claimed is:

1. An encryption-decryption circuit for encrypting and decrypting data comprising:
    an N-bit shift register configured to store and shift an N-bit keyword;
    a first exclusive-OR gate array configured to receive M bits from said N-bit shift register and generate a one-bit exclusive-OR result that is shifted into an input of said N-bit shift register, wherein M is greater than one and said first exclusive-OR gate array is configured to generate said one-bit exclusive-OR result from all M bits received from said N-bit shift register;
    a second exclusive-OR gate array comprising K exclusive-OR gates, each of said K exclusive-OR gates configured to receive one of K bits from said N-bit shift register and one of K data bits from a received K-bit data word and generate therefrom an exclusive-OR result, said K exclusive-OR gates thereby configured to generate one of: 1) a K-bit encrypted data word and 2) a K-bit unencrypted data word, wherein K is greater than one and less than N; and
    a selection circuit configured to couple K bits from said N bits in said N-bit shift register to inputs of said K exclusive-OR gates in said second exclusive-OR gate array, wherein said selection circuit is configured to select said K bits responsive to a control signal.

2. The encryption-decryption circuit as set forth in claim 1 further comprising an N-bit buffer configured to store said N-bit keyword.

3. The encryption-decryption circuit as set forth in claim 1 wherein said N-bit keyword is unique to said encryption-decryption circuit.

4. The encryption-decryption circuit as set forth in claim 1 further comprising an N×M switch configured to couple M selected ones of said N bits in said N-bit shift register to said first exclusive-OR gate array.

5. The encryption-decryption circuit as set forth in claim 1 wherein said second exclusive-OR gate array further comprises adder circuitry configured to add a K-bit value to said K-bit encrypted data word.

6. The encryption-decryption circuit as set forth in claim 1 wherein said second exclusive-OR gate array further comprises subtraction circuitry configured to subtract a K-bit value from said received K-bit data word prior to generation of said exclusive-OR result by said second exclusive-OR gate array.

7. A data processing device comprising:
    processor core logic configured to perform mathematical computations;
    a memory coupled to said processor core logic and configured to store results of said mathematical computations performed by said processor core logic; and an encryption-decryption circuit configured to encrypt and decrypt data used by said processor core logic, the encryption-decryption circuit comprising:
  an N-bit shift register configured to store and shift an N-bit keyword;
  a first exclusive-OR gate array configured to receive M bits from said N-bit shift register and generate a one-bit exclusive-OR result that is shifted into an input of said N-bit shift register, wherein M is greater than one and said exclusive-OR gate array is configured to generate said one-bit exclusive-OR result from all M bits received from said N-bit shift register;
  a second exclusive-OR gate array comprising K exclusive-OR gates, each of said K exclusive-OR gates configured to receive one of K bits from said N-bit shift register and one of K data bits from a received K-bit data word and generate therefrom an exclusive-OR result, said K exclusive-OR gates thereby configured to generate one of: 1) a K-bit encrypted data word and 2) a K-bit unencrypted data word, wherein K is greater than one and less than N; and
  a selection circuit configured to couple K bits from said N bits in said N-bit shift register to inputs of said K exclusive-OR gates in said second exclusive-OR gate array, wherein said selection circuit is configured to select said K bits responsive to a control signal.

8. The data processing device as set forth in claim 7 further comprising an N-bit buffer configured to store said N-bit keyword.

9. The data processing device as set forth in claim 7 wherein said N-bit keyword is unique to said encryption-decryption circuit.

10. The data processing device as set forth in claim 7 further comprising an N×M switch configured to couple M selected ones of said N bits in said N-bit shift register to said first exclusive-OR gate array.

11. The data processing device as set forth in claim 7 wherein said selection circuit comprises an N×K switch.

12. The data processing device as set forth in claim 7 wherein said second exclusive-OR gate array further comprises adder circuitry configured to add a K-bit value to said K-bit encrypted data word.

13. The data processing device as set forth in claim 7 wherein said second exclusive-OR gate array further comprises subtraction circuitry configured to subtract a K-bit value from said received K-bit data word prior to generation of said exclusive-OR result by said second exclusive-OR gate array.

14. A method of decrypting data comprising the steps of:
  sequentially shifting an N-bit keyword in an N-bit shift register;
  selecting M bits from the N-bit shift register and determining therefrom a one-bit exclusive-OR result, wherein M is greater than one and the one-bit exclusive-OR result is generated from all M bits;
  shifting the one-bit exclusive-OR result into an input of the N-bit shift register as the N-bit keyword is sequentially shifted; and
  selecting K bits from the N-bit shift register and exclusive-ORing each of the selected K bits with one of K data bits from an encrypted K-bit data word to thereby produce a K-bit unencrypted data word, wherein K is greater than one and less than N and wherein said K bits are selected responsive to a control signal.

15. The method as set forth in claim 14 wherein the step of selecting M bits from the N-bit shift register comprises the step of using an N×M switch to selectively couple the M selected ones of the N bits in the N-bit shift register to a first exclusive-OR gate array operable to determine the one-bit exclusive-OR result.

16. The method as set forth in claim 15 wherein the step of selecting K bits from the N-bit shift register comprises the step of using an N×K switch to selectively couple the K selected ones of the N bits in the N-bit shift register to inputs of K exclusive-OR gates in a second exclusive-OR gate array.

17. A method of encrypting data comprising the steps of:
  sequentially shifting an N-bit keyword in an N-bit shift register;
  selecting M bits from the N-bit shift register and determining therefrom a one-bit exclusive-OR result, wherein M is greater than one and the one-bit exclusive-OR result is generated from all M bits;
  shifting the one-bit exclusive-OR result into an input of the N-bit shift register as the N-bit keyword is sequentially shifted; and
  selecting K bits from the N-bit shift register and exclusive-ORing each of the selected K bits with one of K data bits from an unencrypted K-bit data word to thereby produce a K-bit encrypted data word, wherein K is greater than one and less than N and wherein said K bits are selected responsive to a control signal.

18. The method as set forth in claim 17 wherein the step of selecting M bits from the N-bit shift register comprises the step of using an N×M switch to selectively couple the M selected ones of the N bits in the N-bit shift register to a first exclusive-OR gate array operable to determine the one-bit exclusive-OR result.

19. The method as set forth in claim 18 wherein the step of selecting K bits from the N-bit shift register comprises the step of using an N×K switch to selectively couple the K selected ones of the N bits in the N-bit shift register to inputs of K exclusive-OR gates in a second exclusive-OR gate array.

20. The encryption-decryption circuit of claim 1, wherein: M is less than N.

21. An apparatus, comprising:
  a circuit comprising:
    an N-bit shift register configured to store and shift an N-bit keyword;
    a first exclusive-OR gate array configured to receive M bits from the N-bit shift register and generate a one-bit exclusive-OR result that is shifted into an input of the N-bit shift register, wherein M is greater than one and the first exclusive-OR gate array is configured to generate the one-bit exclusive-OR result from all M bits;
    a second exclusive-OR gate array comprising K exclusive-OR gates, each of the K exclusive-OR gates configured to receive one of K bits from the N-bit shift register and one of K data bits from a received K-bit data word and generate therefrom an exclusive-OR result, the K exclusive-OR gates thereby configured to generate one of: 1) a K-bit encrypted data word and 2) a K-bit unencrypted data word, wherein K is greater than one and less than N; and
    a selection circuit configured to couple K bits from the N bits in the N-bit shift register to inputs of the K exclusive-OR gates in the second exclusive-OR gate array, wherein the selection circuit is configured to select the K bits responsive to a control signal; and
  a memory configured to store at least one of: the K-bit encrypted data word and the K-bit unencrypted data word.

22. The apparatus of claim 21, wherein the memory comprises a Flash memory.

23. The apparatus of claim 21, further comprising logic configured to provide the received K-bit data word.

24. The apparatus of claim 23, wherein the logic comprises processor core logic.

25. The apparatus of claim 21, wherein the circuit further comprises an N-bit buffer configured to store the N-bit keyword.

26. The apparatus of claim 21, wherein the circuit further comprises an N×M switch configured to couple M selected ones of the N bits in the N-bit shift register to the first exclusive-OR gate array.

27. The apparatus of claim 21, wherein the selection circuit comprises an N×K switch configured to couple K selected ones of the N bits in the N-bit shift register to the inputs of the K exclusive-OR gates in the second exclusive-OR gate array.

28. The apparatus of claim 21, wherein the second exclusive-OR gate array further comprises adder circuitry configured to add a K-bit value to the K-bit encrypted data word prior to storage in the memory.

29. The apparatus of claim 21, wherein the second exclusive-OR gate array further comprises subtraction circuitry configured to subtract a K-bit value from the received K-bit data word prior to generation of the exclusive-OR result by the second exclusive-OR gate array.

30. The encryption-decryption circuit of claim 1, wherein the first exclusive-OR gate array is configured to generate the one-bit exclusive-OR result using a formula of:

$$f(b)=Ba \oplus Bb \oplus Bc \oplus \ldots \oplus Bg$$

where f(b) represents the one-bit exclusive-OR result, Ba through Bg represent the M bits from the N-bit shift register, and $\oplus$ represents the exclusive-OR operation.

31. The encryption-decryption circuit of claim 1, wherein said selection circuit is adapted to couple a first set of K bits from said N-bit shift register to said inputs of said K exclusive-OR gates responsive to a first value of said control signal and to couple a different second set of K bits from said N-bit shift register to said inputs of said K exclusive-OR gates responsive to a different second value of said control signal.

32. The data processing device of claim 7, wherein the selection circuit is configured to:

couple a first set of K bits from the N-bit shift register to the inputs of the K exclusive-OR gates in the second exclusive-OR gate array responsive to a first value of the control signal; and couple a different second set of K bits from the N-bit shift register to the inputs of the K exclusive-OR gates in the second exclusive-OR gate array responsive to a different second value of the control signal.

33. The method of claim 14, wherein selecting the K bits from the N-bit shift register comprises:

selecting a first set of K bits from the N-bit shift register responsive to a first value of the control signal, the first set of K bits used to generate a first K-bit unencrypted data word; and selecting a different second set of K bits from the N-bit shift register responsive to a different second value of the control signal, the second set of K bits used to generate a second K-bit unencrypted data word.

34. The method of claim 17, wherein selecting the K bits from the N-bit shift register comprises:

selecting a first set of K bits from the N-bit shift register responsive to a first value of the control signal, the first set of K bits used to generate a first K-bit encrypted data word; and selecting a different second set of K bits from the N-bit shift register responsive to a different second value of the control signal, the second set of K bits used to generate a second K-bit encrypted data word.

35. The apparatus of claim 21, wherein the selection circuit is configured to:

couple a first set of K bits from the N-bit shift register to the inputs of the K exclusive-OR gates in the second exclusive-OR gate array responsive to a first value of the control signal; and couple a different second set of K bits from the N-bit shift register to the inputs of the K exclusive-OR gates in the second exclusive-OR gate array responsive to a different second value of the control signal.

* * * * *